G. I. LEONARD.
COMPRESSOR.
APPLICATION FILED MAY 5, 1920.
1,424,312. Patented Aug. 1, 1922.
3 SHEETS—SHEET 3.
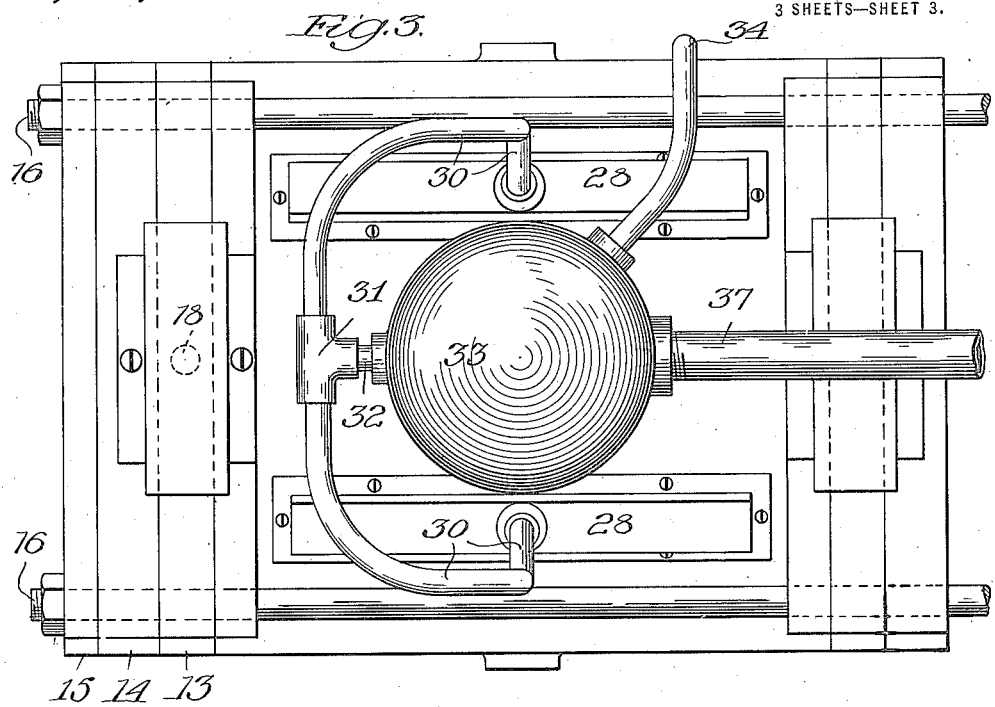
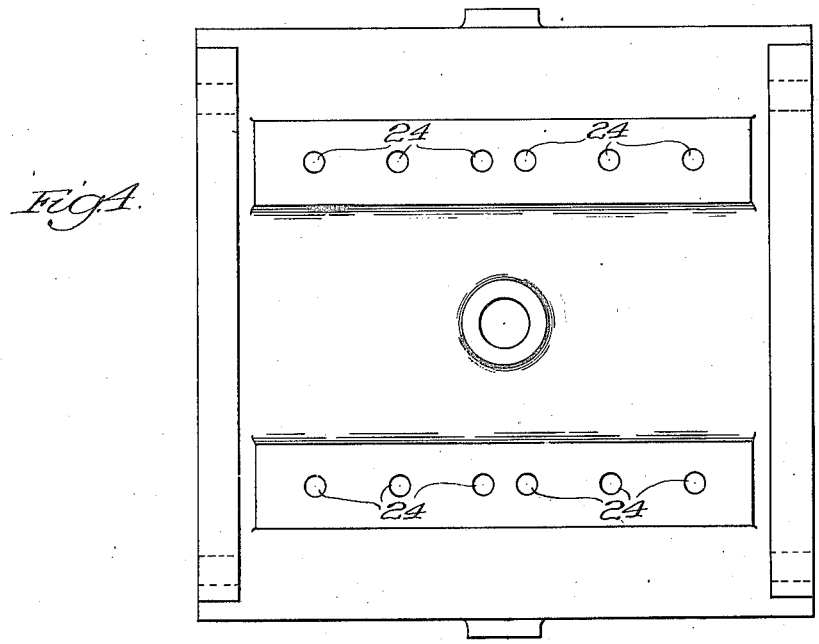
Inventor,
George I. Leonard,

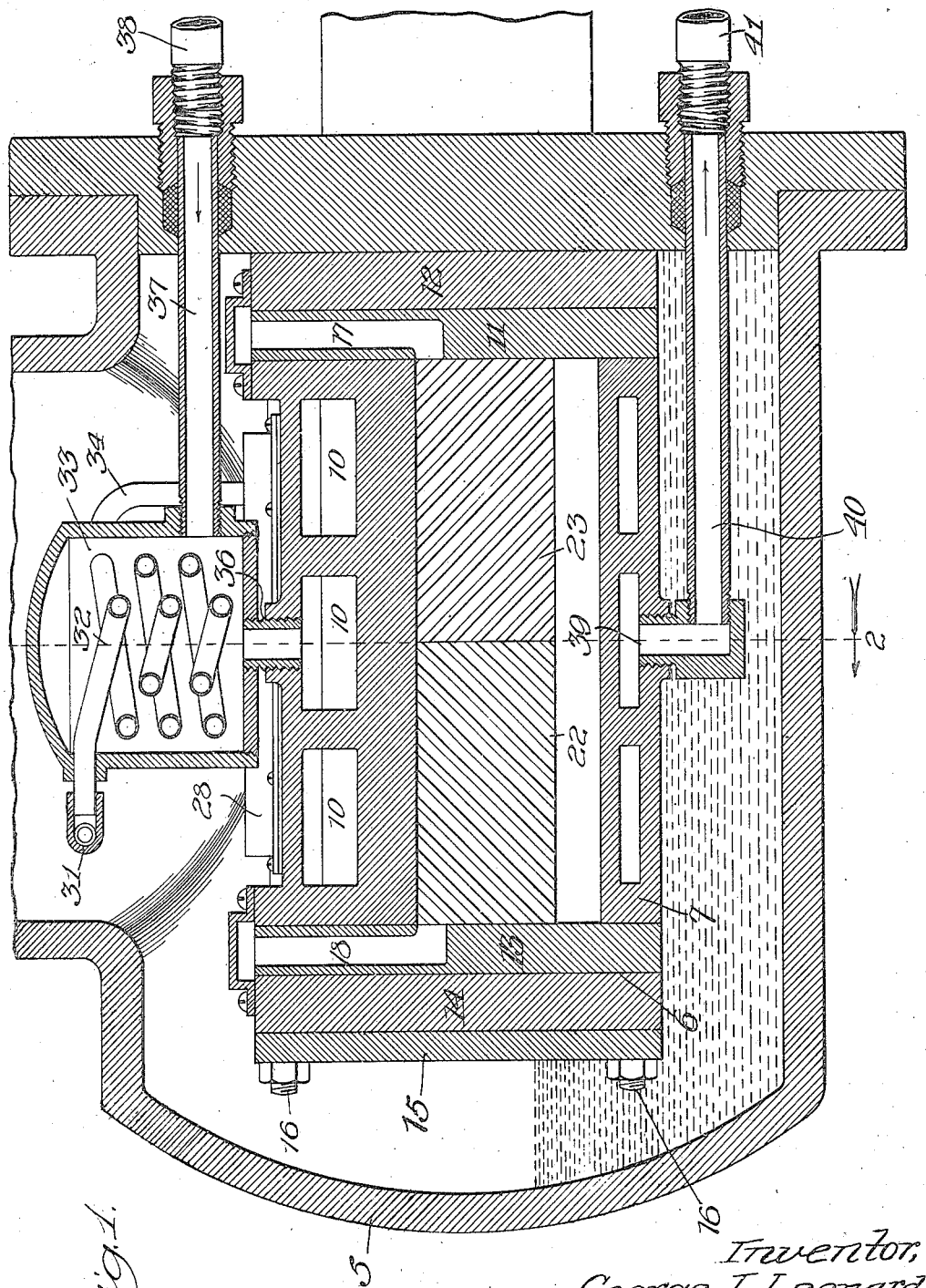

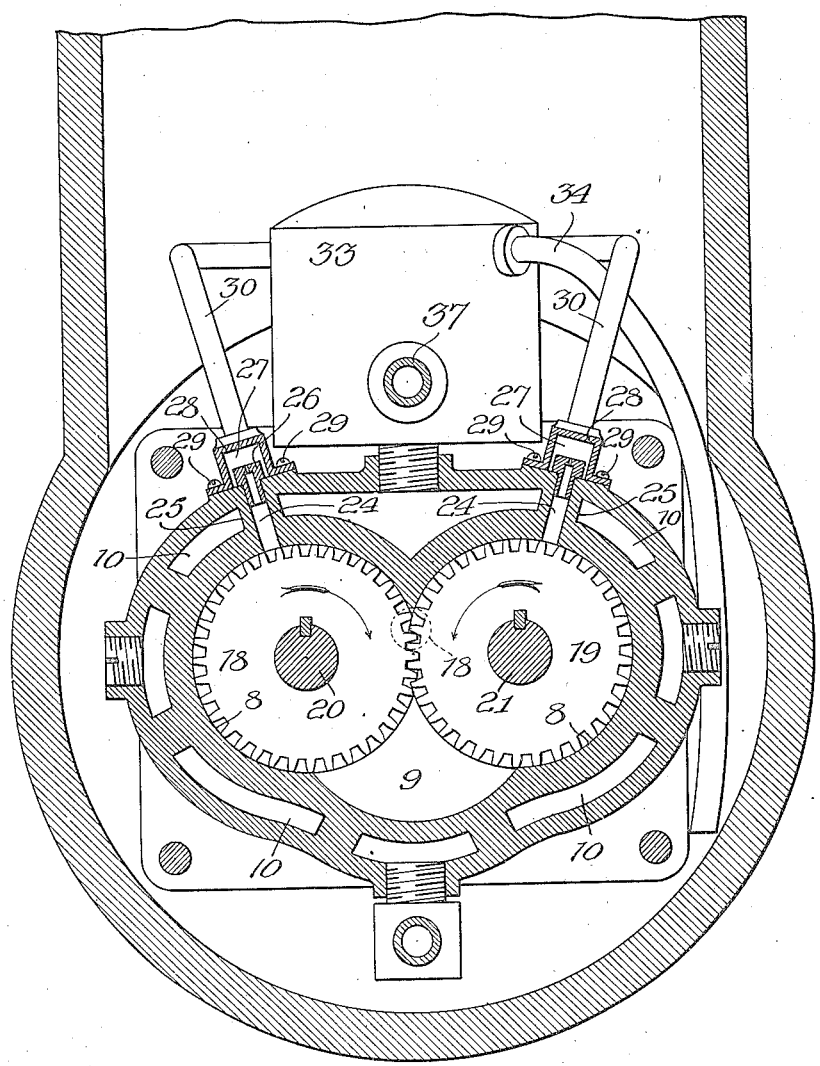

UNITED STATES PATENT OFFICE.

GEORGE I. LEONARD, OF CHICAGO, ILLINOIS.

COMPRESSOR.

1,424,312.

Specification of Letters Patent.   Patented Aug. 1, 1922.

Application filed May 5, 1920. Serial No. 379,042.

*To all whom it may concern:*

Be it known that I, GEORGE I. LEONARD, a citizen of the United States, residing at Chicago, in the county of Cook and State of Illinois, have invented a new and useful Improvement in Compressors, of which the following is a specification.

My invention relates, more particularly, to rotary compressors of the type employing a casing containing an inlet and an outlet, and intermeshing gears journaled therein and operating in their rotation to compress gas entering the inlet and discharge it in compressed condition through the outlet.

As a preface to the following recital of my more particular objects, and as bearing on certain thereof, it may be stated that a certain phase of the invention relates to a compressor wherein provision is made for directing sealing liquid into the gear case in position to form a liquid seal to enhance the compressing effect. The degree of seal effected by the liquid is dependent upon the temperature of the liquid—the thinner the liquid the less effective the seal. Furthermore, the cooler the entire compressor structure is maintained, the more effective the operation of the compressor, and the less power required for effecting compression.

One of my objects is to provide for the cooling of the walls of the gear case and the sealing liquid, thereby to effect the advantages hereinbefore mentioned; and other objects as will appear from the following:

Referring to the accompanying drawings, Figure 1 is a view in longitudinal sectional elevation of a compressor embodying my invention. Figure 2 is a section taken at the line 2 on Fig. 1 and viewed in the direction of the arrow. Figure 3 is a plan view of the structure, with the outer housing removed; and Figure 4 a view of the structure of Fig. 3 with certain parts removed.

In the particular construction illustrated, the compressor is formed of a housing 5 affording a receptacle for the sealing liquid which is preferably also a lubricant, and into which the gas compressed by the compressor discharges and from which it passes as for example to storage. Located within the housing 5 is a gear casing 6 shown as formed of a section 7 containing openings of circular shape in cross-section and represented at 8, extending completely therethrough, these openings intersecting toward the center of the casing as shown in Fig. 2 and the latter being cut away, throughout its length, adjacent the lower portions of the openings 8 as indicated at 9, the space thus provided forming the inlet chamber of the compressor and which would be in communication with the gas to be compressed. The wall of the gear-case section 7 is chambered as indicated at 10 to permit a cooling medium, as for example water, to be circulated therethrough and cool the wall, the latter being thus water-jacketed.

The end walls of the gear case, in the particular construction illustrated, are formed of a plurality of plates, one wall being formed of the plates 11 and 12 and the other wall formed of the plates 13, 14 and 15, these plates being held in assembled relation with the casing wall 7 by means of bolts 16. In the construction illustrated the discharge of the compressed gas is effected at the ends of the gear case, and through the outlet passages 17 and 18 in the plates 12 and 14, respectively, the compressed gas discharging therefrom into the housing 5.

The intermeshing gears which in their operation operate to compress the gas, are represented at 18 and 19, these gears being shown as of the herringbone type and keyed on the shafts 20 and 21 journaled in the end walls of the gear casing, these gears being located within the circular bores 8 in the gear case, and having close journal fit therein. Each of the gears 18 and 19 is formed in sections 22 and 23 secured on the shaft supporting them, in alined condition, the teeth on these sections extending in opposite directions, as represented in Fig. 1, whereby when the gears 18 and 19 are rotated, as for example by applying a driving force to either one of the shafts 20 or 21, to cause these gears to rotate in the direction of the arrows in Fig. 2, gas entering the chamber 9 will enter the grooves between the teeth of the gears as they pass from intermeshing position to a position in which they open into the space 9, and will thence be carried upwardly in these grooves from which it is forced, by the intermeshing of the gears, through the outlets 17 and 18, which latter occupy a position relative to the intermeshing portions of the gear as represented of the outlet 18 in Fig. 2.

The compressor is provided with means for causing a lubricating and sealing liquid to enter between the peripheries of the gears and the walls of the casing adjacent to which they move, these means in the particular arrangement illustrated involving the provision of a series of passages 24 extending through the side walls of the gear casing, preferably at the upper side thereof and opening into the bores 8 in which the gears are located, the passages 24 being shown as extending through webs 25 connecting together the inner and outer spaced walls of the gear case by reason of the spaced relation of which the chamber 10 is presented. The outer ends of the passages 24 are equipped with reducer nozzles 26 which open at their lower ends into the passages 24 and at their upper ends into chambers 27 presented by recessed cap plates 28 secured to the gear casing as by screws 29, there being provided for each series of the passages 24 one of the cap plates 28. The interiors of the chambers 27 communicate with pipes 30 opening through the cap plates 28 and connected with a coupler 31 connected with a pipe 32 shown as in the form of a coil located within a chamber 33, the other end of this coil terminating in the pipe portion 34 which extends downwardly and is submerged at its lower, open, end in a supply of sealing liquid, of any desirable kind, represented at 35 and preferably also a lubricant, and which is contained within the receptacle 5. The chamber 33 is provided for subjecting the coil 32, and consequently the sealing liquid circulated therethrough as hereinafter described, to a cooling medium, as for example water, this chamber being located in series with the chamber 10 of the gear case, this communication being had through the pipe 36 which opens at its upper end into the lower portion of the chamber 33 and at its lower end into the chamber 10. The pipe through which the cooling liquid is supplied to the chamber 33 is represented at 37 and is shown as connected with a pipe 38 leading to any suitable source of cooling liquid, as for example water. The outlet from the chamber 10 is represented at 39, it being shown as at the bottom of the chamber and communicating with a pipe 40 preferably submerged in the bath 35 and in communication with a pipe 41 which may lead to a drain.

It will be understood from the foregoing that in the operation of the compressor the sealing liquid is forced, by the pressure of the compressed gas in the housing 5 against the upper surface of the bath 35, through the pipe 34 and coil 32, and thence through the pipes 30, chambers 27 and passages 24, into contact with the peripheries of the gears 18 and 19, the liquid serving to prevent the escape of the gas, during the compression operation, to the chamber 9, and discharging with the compressed gas through the outlets 18 into the housing 5 in which it gravitates into the bath 35, The cooling medium circulated through the course hereinbefore described serves to maintain the sealing liquid in relatively cool condition, and by reason of the subjection of the walls of the passages 25 to the cooling medium, close to the points at which the sealing liquid enters the bores 8, insures the reduction of the liquid to such a relatively low temperature that it enters these bores in such relatively cool, and thick, condition that a high degree of sealing effect is obtained. The cooling of the sealing liquid is augmented by the cooling of the walls of the compressor which is effected, as hereinbefore stated, by their subjection to the action of the cooling fluid in the chamber 10.

While I have illustrated and described a particular construction embodying my invention, I do not wish to be understood as intending to limit it thereto as the same may be variously modified and altered without departing from the spirit of the invention.

What I claim as new and desire to secure by Letters Patent is:

1. A rotary compressor comprising, in combination, a chamber for receiving a bath of sealing liquid, a gear case extending into said bath and containing an inlet and an outlet, intermeshing gears rotatable in said gear case and operating to compress the gas entering the case through said inlet and discharge it through said outlet, the liquid in said chamber being subjected to the pressure of the gas compressed by said gears, a water-jacket for said gear case and extending into said bath, and means for conducting liquid from the body thereof in said chamber, into said gear case, said means being subjected to the cooling action of water in said jacket and cooling the liquid.

2. A rotary compressor comprising, in combination, a gear case containing an inlet and an outlet, intermeshing gears rotatable therein and operating to compress the gas entering the case through said inlet, and discharge it through said outlet, a water-jacket for said gear case, means for directing a sealing liquid into said gear case, and means for subjecting said first-named means to the action of a cooling medium, said last-named means and said water-jacket being arranged in series whereby the same cooling medium is caused to effect, in its flow through the device, the cooling of the sealing liquid and walls of said gear case.

3. A rotary compressor comprising, in combination, a gear case containing an inlet and an outlet, intermeshing gears rotatable therein and operating to compress the gas entering the case through said inlet and discharge it through said outlet, a water-jacket for said gear case, a conduit in communication with said water-jacket, and means for directing sealing liquid into said gear case including a second conduit arranged to be cooled by the flow of a cooling medium through said first-referred-to conduit, and means for causing a cooling medium to flow through said first-referred-to conduit and said water-jacket in succession.

4. A rotary compressor comprising, in combination, a gear case containing an inlet and an outlet, intermeshing gears rotatable therein and operating to compress the gas entering the case through said inlet and discharge it through said outlet, a chamber for receiving a bath of sealing liquid into which said gear extends, a water-jacket for said gear case and extending into said bath, a conduit opening into the water-jacketed portion of said gear case and through which the cooling fluid flows, said conduit extending into said bath, and mean for conducting liquid from the body thereof in said chamber, into said gear case, said means being subjected to the cooling action of water in said jacket and cooling the liquid.

GEORGE I. LEONARD.